United States Patent
Zhao et al.

(10) Patent No.: US 9,622,018 B2
(45) Date of Patent: Apr. 11, 2017

(54) METHOD AND DEVICE FOR PROCESSING DATA TRANSMISSION OF MACHINE-TYPE COMMUNICATION DEVICE

(75) Inventors: Yi Zhao, Beijing (CN); Jiayi Fang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 128 days.

(21) Appl. No.: 13/700,721

(22) PCT Filed: Aug. 29, 2011

(86) PCT No.: PCT/CN2011/079034
§ 371 (c)(1),
(2), (4) Date: Nov. 28, 2012

(87) PCT Pub. No.: WO2012/028076
PCT Pub. Date: Mar. 8, 2012

(65) Prior Publication Data
US 2013/0077484 A1 Mar. 28, 2013

(30) Foreign Application Priority Data
Aug. 30, 2010 (CN) .......................... 2010 1 0267798

(51) Int. Cl.
*H04W 4/00* (2009.01)
*H04W 4/20* (2009.01)
(Continued)

(52) U.S. Cl.
CPC ............. *H04W 4/005* (2013.01); *H04W 4/20* (2013.01); *H04W 72/1252* (2013.01)

(58) Field of Classification Search
CPC . H04W 24/02; H04W 72/0406; H04W 24/10; H04W 72/04; H04W 72/044; H04W 4/00; H04W 28/10
(Continued)

(56) References Cited

U.S. PATENT DOCUMENTS

2008/0153521 A1    6/2008  Benaouda et al.
2008/0209046 A1*   8/2008  Karkanias ............... H04L 29/06
                                                      709/227
(Continued)

FOREIGN PATENT DOCUMENTS

CN    101808406 A    8/2010
EP    1 727 329      11/2006
(Continued)

OTHER PUBLICATIONS

Supplementary European Search Report mailed Jan. 3, 2014 in European Application No. 11821102.8.
(Continued)

Primary Examiner — Mohamed Kamara
Assistant Examiner — Will Lin
(74) Attorney, Agent, or Firm — Foley & Lardner LLP; James F. Ewing; Paul M. H. Pua

(57) ABSTRACT

Disclosed are a method and device for processing data transmission by a machine-type communication device. The method comprises: determining, by the network side, the mode for the machine-type communication device to transmit a small amount of user data using a control plane; instructing, by the network side, the machine-type communication device to transmit the small amount of user data using the control plane according to the determined mode; and transmitting, by the machine-type communication device, the small amount of user data using the control plane, according to instructions from the network side. In the
(Continued)

present application, on the one hand, the mode of transmitting user data by a control plane can be used in transmitting a small amount of data, so as to improve the system efficiency; and on the other hand, the possibility of causing or increasing the congestion in signalling transmission and/or processing can be avoided when making full use of the mode of transmitting user data by the control plane in transmitting the small amount of data, thus improving the performance of a long-term evolution system in supporting the machine-type communication device.

12 Claims, 3 Drawing Sheets

(51) Int. Cl.
  *H04W 28/10* (2009.01)
  *H04W 72/12* (2009.01)

(58) Field of Classification Search
  USPC .................................. 370/230, 329, 328, 338
  See application file for complete search history.

(56) References Cited

U.S. PATENT DOCUMENTS

| | | | |
|---|---|---|---|
| 2009/0080396 A1 | 3/2009 | Song et al. | |
| 2011/0299492 A1* | 12/2011 | Lee et al. | 370/329 |
| 2013/0051228 A1* | 2/2013 | Kim | H04W 4/005 370/230 |
| 2013/0100895 A1* | 4/2013 | Aghili | H04W 4/00 370/329 |

FOREIGN PATENT DOCUMENTS

| | | |
|---|---|---|
| EP | 2 182 328 | 5/2010 |
| WO | WO-2010/035137 A2 | 4/2010 |

OTHER PUBLICATIONS

International Search Report for PCT/CN2011/079034—mailed Nov. 24, 2011.
Examination Report mailed Jun. 4, 2014 in European Application No. 11821102.8.
"Netowork Improvements for Small Data Transmission," 3GPP TSG SA WG2 Meeting No. 78, Feb. 22-26, 2010, San Francisco, pp. 7-12.

* cited by examiner

METHOD AND DEVICE FOR PROCESSING DATA TRANSMISSION OF MACHINE-TYPE COMMUNICATION DEVICE

This application is a US National Stage of International Application No. PCT/CN2011/079034, filed Aug. 29, 2011, designating the United States, and claiming the benefit of Chinese Patent Application No. 201010267798.8, filed with the Chinese Patent Office on Aug. 30, 2010 and entitled "Method and device for data transmission process of machine type communication device", both of which are hereby incorporated by reference in their entireties.

FIELD

The present invention relates to the field of mobile communications and particularly to a method and device for a data transmission process of a machine type communication device.

BACKGROUND

Machine Type Communication (MTC) is a new type of communication idea for the purpose of organic integration of various different types of communication technologies, for example, machine to machine communication, machine controlled communication, human-machine interactive communication, mobile interconnection communication, etc., to thereby promote the development of social production and life styles. Human to human communication services are expected to possibly occupy only one third of the entire terminal market, and a larger number of communications will be MTC communication services. MTC communication is sometimes referred to as Machine to Machine (M2M) communication or Internet of Things.

The existing mobile communication network is designed, for example, the network capacity is determined, etc., for communication between one person and another. If it is desired to support MTC communication on the mobile communication network, a mechanism of the mobile communication network has to be optimized in view of characteristics of MTC communication so that MTC communication can be better performed without influence or with little influence upon traditional human to human communication.

Some possible characteristics of MTC communication as currently recognized are the following:

an MTC terminal has low mobility;

an MTC terminal performs data transmission with the network side for a controllable period of time;

an MTC terminal performs data transmission with the network side with a low instantaneity requirement, that is, with a time tolerance;

an MTC terminal is limited in power and required with extremely low power consumption;

there is only a small data amount of information transmission performed between an MTC terminal and the network side;

MTC terminals can be managed per in unit of groups;

. . .

A real MTC terminal may have one or more of the foregoing characteristics.

In numerous MTC application scenarios, an MTC device transmits only a small data amount of data to the network side, and if the data is transmitted in a traditional data transmission scheme, then there will be a significant signalling overhead, thus resulting in a low efficiency of a system; or if the small data amount of data is transmitted in a scheme of transmitting user data on a control plane, then a drawback thereof lies in the following despite a lowered signalling overhead and improved efficiency of the system:

congestion of transmitted and processed signalling may be incurred or aggravated when the system is heavily loaded.

SUMMARY

An aspect of the invention is to provide a method and device for a data transmission process of a machine type communication device so as to address the problem in the prior art of congestion of transmitted and processed signalling that may be incurred or aggravated when a small data amount of user data is transmitted for MTC on a control plane.

There is provided in an embodiment of the invention a method for a data transmission process of an MTC device, including:

determining at a network side a scheme of transmitting a small data amount of user data on a control plane for the MTC device; and instructing at the network side the MTC device to transmit a small data amount of user data on the control plane in the determined scheme.

There is provided in an embodiment of the invention a method for a data transmission process of an MTC device, including:

the MTC device determining an indication of a network side which indicates a scheme of transmitting a small data amount of user data on a control plane for the MTC device; and the MTC device transmitting a small data amount of user data on the control plane according to the indication of the network side.

There is provided in an embodiment of the invention a network-side device including:

a determining module, configured to determine a scheme of transmitting a small data amount of user data on a control plane for an MTC device; and an instructing module, configured to instruct the MTC device to transmit a small data amount of user data on the control plane in the determined scheme.

There is provided in an embodiment of the invention an MTC device including:

a determining module configured to determine an indication of a network side which indicates a scheme of transmitting a small data amount of user data on a control plane for the MTC device; and a transmitting module configured to transmit a small data amount of user data on the control plane according to the indication of the network side.

Advantageous effects of the invention are as follows:

since relevant indication information about allowed transmission of a small data amount of data in a scheme of transmitting user data on a control plane is transmitted at the network side so that an MTC device can determine, from the relevant indication information transmitted at the network side, whether data can be transmitted in the scheme of transmitting user data on the control plane, it is thus possible to make use of the scheme of transmitting user data on the control plane to transmit a small data amount of data for improved efficiency of a system on one hand and to avoid congestion of transmitted and/or processed signalling that may be incurred or aggravated when a small data amount of data is transmitted purely in the scheme of transmitting user data on the control plane to thereby improve the performance of the LTE system to support MTC on the other hand.

DETAILED DESCRIPTION OF THE EMBODIMENTS

The inventors have identified the following during making of the invention:

in numerous MTC application scenarios, an MTC device transmits only a small data amount of data to the network side, and if the data is transmitted in a traditional data transmission scheme, then there will be a significant signalling overhead, thus resulting in a low efficiency of a system; or if the small data amount of data is transmitted in a scheme of transmitting user data on a control plane, then congestion of transmitted and processed signalling may be incurred or aggravated when the system is heavily loaded despite a lowered signalling overhead and improved efficiency of the system. Occurrence of this phenomenon will be analyzed below.

Figure 1:
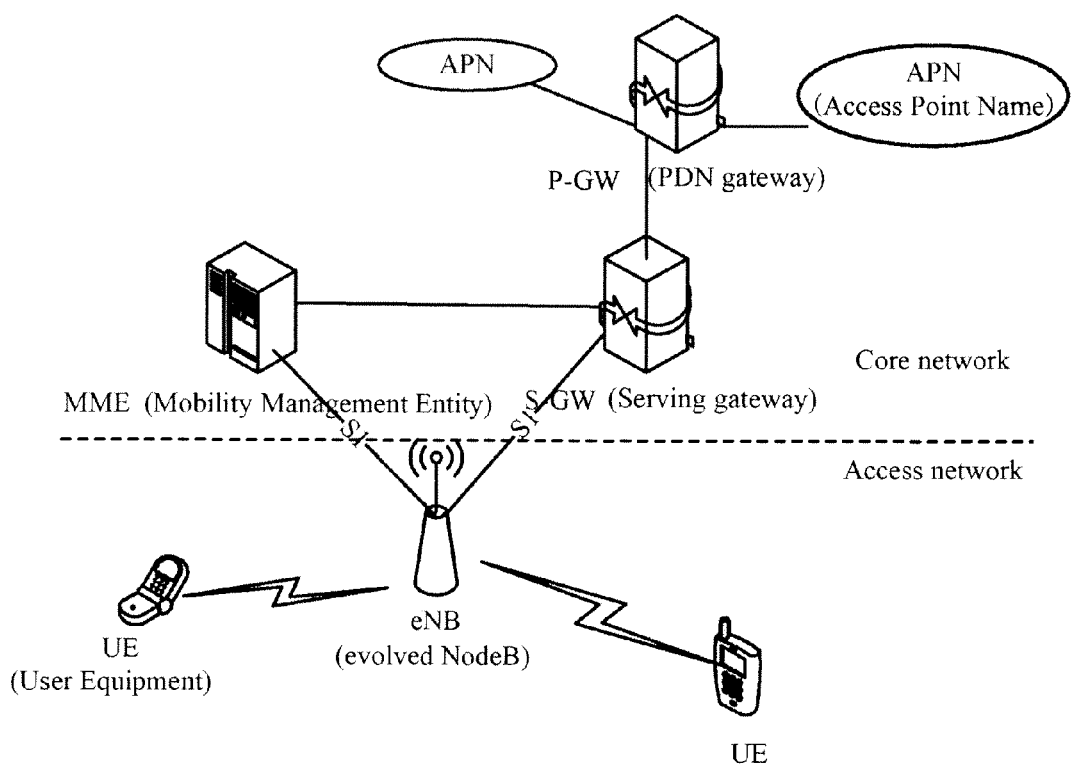
FIG. 1 is a schematic diagram of a network architecture of an LTE system in an embodiment of the invention.

FIG. 1 is a schematic diagram of a network architecture of a Long Term Evolution (LTE) system, and as illustrated, a design where a user plane is separated from a control plane is adopted for the LTE system in order to facilitate deployment of a new service, where control plane signalling and a user plane bearer are taken charge of respectively by separate network elements, a Mobile Management Entity (MME) and a Serving Gateway (S-GW). The MME primarily functions for Non Access Stratum (NAS) signalling establishment, NAS signalling security, signalling establishment across a core network, and service tracking, a roaming service, authorization and bearer management when a User Equipment (UE) is in an idle mode, etc. The S-GW is a portal for a handover to an evolved Node B (eNB) and a portal for forwarding services of 2G/3G and other systems and functions for downlink packet buffer, some initialization tasks, specified interception and listening, packet routing and forwarding, etc. A Packet Data Network (PDN) Gateway (P-GW) functions for policy enforcement, packet filtering, specified interception, UE Internet Protocol (IP) address allocation, charging, packet reproduction, etc.

Control signalling between the UE, the eNB and the core network is processed by the MME; and user data is transmitted to the P-GW through the S-GW and then transmitted by the P-GW to various external Access Point Name (APN) nodes. Due to reduced coupling of control signalling with user data, only the network element taking charge of a user plane bearer will be upgraded for a new service without influencing transmission of control signalling, thereby lowering greatly the complexity of network maintenance and the cost of equipment upgrading.

A control plane signalling flow will be analyzed below.

Figure 2:
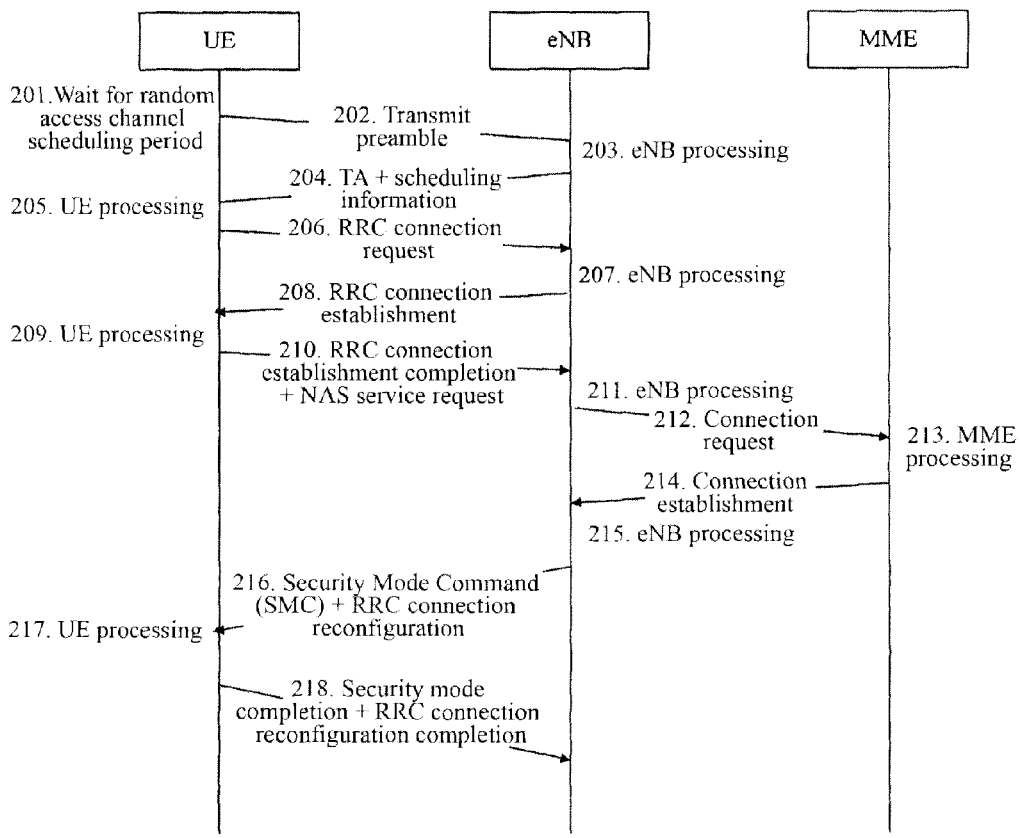
FIG. 2 is a schematic diagram of a signalling flow in a process of establishing a connection in an embodiment of the invention.

FIG. 2 is a schematic diagram of a signalling flow in a process of establishing a connection, and as illustrated, the UE in an idle state in the LTE system establishes a connection in the following signalling flow if the UE has data to be transmitted to the network side.

Operation 201. When the UE has data to be transmitted, the UE firstly waits for a Random Access Channel (RACH) scheduling period according to information about a random access resource configured by the system and selects a preamble and then transmits an Msg1 (a message 1) to the eNB.

Operation 202-operation 204. The eNB transmits a random access response message (an Msg2 or a message 2) to the UE in a random access response window upon reception of the preamble (i.e., the Msg1) transmitted by the UE. A random access response message (an Msg2) can respond to random access requests (preambles) of a plurality of UEs.

The Msg2 is scheduled by Downlink Control Information (DCI) scrambled with a Random Access (RA)-Radio Network Temporary Identity (RNTI) (RA-RNTI) determined by the location of a time and frequency resource on which the Msg1 is transmitted. Contents in the Msg2 include a backoff parameter, a preamble identifier corresponding to the Msg1an uplink Timing Alignment (TA), an uplink resource allocated for an Msg3 (Msg3 scheduling information), a temporary Cell-RNTI (C-RNTI), etc. The backoff parameter indicates an average delay value at which the UE initiates the next random access if the current random access fails. The UE determines from the RA-RNTI and the preamble identifier in the Msg2 the random access response transmitted thereto, and if the preamble identifier in the Msg2 corresponds to a preamble including the preamble when the UE initiates the random access, then the UE determines its successful reception of the random access response message and subsequently transmits the Msg3 to the network side; if the UE does not receive correctly the Msg2 then the UE determines from the time delay defined by the backoff parameter a time delay at which the next random access is initiated and further selects a random access resource and initiates the next random access. A Media Access Control (MAC) layer of the UE reports a random access problem to a Radio Resource Control (RRC) layer when the largest number of random accesses is reached.

Operation 205. The UE transmits the Msg3 on the uplink resource allocated in the Msg2 upon reception of the Msg2

The Msg3 includes different contents for different scenarios. The Msg3 carries an RRC connection establishment request message generated by the RRC layer for an initial access.

Operation 206 to operation 208. The eNB and the UE perform final contention resolution through an Msg4 Contents of the Msg4 correspond to those of the Msg3 The Msg4 carries a Contention Resolution Identity MAC layer Control Element (MAC CE) for an initial access, which includes a Common Control Channel (CCCH) Service Data Unit (SDU) transmitted in the Msg3 by the UE, and the UE compares the MAC CE with its RRC layer information upon reception thereof to perform contention resolution. Moreover the Msg4 may include an RRC connection establishment message for establishing a Signalling Radio Bearer1 (SRB1) of the UE.

Operation 209 to operation 210. The UE establishes the Signalling Radio Bearer1 (SRB1) according to the information in the RRC connection establishment message after performing contention resolution and transmits an RRC connection establishment completion message to the network. An NAS service request message may be carried and transmitted to the network side when the RRC connection establishment completion message is transmitted.

Operation 211 to operation 215. The eNB transmits the carried NAS service request message to the MME upon reception of the RRC connection establishment completion message to request the MME for establishing relevant connections between the eNB corresponding to the UE and the network element of the core network (a control plane connection with the MME and an S1 interface bearer with the S-GW).

The MME notifies the eNB of information about the corresponding connections of the UE.

Operation 216 to operation 217. The eNB transmits a Security Mode Command (SMC) and an RRC connection reconfiguration message to the UE to activate security of the UE and to establish a Data Radio Bearer (DRB) and another signalling radio bearer (SBR2) for the UE.

It shall be noted that the Security Mode Command (SMC) and the RRC connection reconfiguration message may be transmitted in a single RRC message or separately.

Operation 218. The UE transmits a security mode completion message and an RRC connection reconfiguration completion message to the network side after activating security and configuring the DRB and the SRB2.

At this time, user plane data of the UE is borne on the DRB and the S1 bearer and transmitted to the core network through the eNB and the S-GW; and controlling signalling between the UE and the core network is transmitted to the MME through the SRB and on the control plane between the eNB and the MME.

For the UE in a detached state, the UE shall firstly initiate an attach procedure to be attached to the network when the UE has data to be transmitted to the network side, and moreover the UE shall be authenticated for confirmation of legality in an authentication procedure process. There is a more complex signalling flow relative to the process illustrated in FIG. 2, which will not be detailed here, and reference can be made to a description in a relevant protocol.

Although the number of MTC terminals in MTC may go far beyond the number of traditional communication terminals, the amount of data reported each time will not be significant and the data can be transmitted in one or several sub-frames in numerous MTC application scenarios. However in the existing data transmission scheme, an MTC terminal transmitting the data has to transmit the data to the network side on the DRB and the S1 bearer only after also establishing the DRB in the foregoing signalling flow, and as can be apparent from the foregoing signalling flow, a signalling overhead required for transmitting a small amount of data will be relatively considerable and thus degrade seriously the efficiency of a system. Thus a small data amount of user data information can be transmitted on the control plane instead of traditionally transmitting the small data amount of user data information through establishing a DRB and an S1 bearer, for example, a small data amount of data to be transmitted is carried directly in RRC signalling (e.g., a connection establish request or RRC connection establishment completion message) and transmitted to the eNB and transmitted on a control plane connection to the core network to thereby alleviate consumed signalling for transmitting the small data amount of information and an occupied air interface resource.

Transmission of a small data amount of user data on the control plane may improve the efficiency of the system, but this scheme may also increase a transmission load on the control plane. When the system is highly loaded, the scheme of transmitting a small data amount of user data on the control plane may incur or aggravate congestion of transmission and/or processing on the control plane, e.g., congestion of processed signalling at the eNB, congestion of transmitted signalling on the connection between the eNB and the MME, etc. Since an MME may be connected to a plurality of eNBs, congestion of processed signalling at the MME may also be incurred when control plane signalling of the plurality of eNBs is transmitted to the MME for processing.

In view of this, in order to be able to transmit a small data amount of data in the scheme of transmitting user data on the control plane for improved efficiency of the system on one hand and to avoid congestion of transmitted and/or processed signalling that may be incurred or aggravated when a small data amount of data is transmitted purely in the scheme of transmitting user data on the control plane on the other hand, such a solution to a data transmission scheme will be proposed in embodiments of the invention that relevant indication information about transmission of a small data amount of data in a scheme of transmitting user data on a control plane is transmitted at the network side to indicate to an MTC device whether a small data amount of data can be transmitted in the scheme of transmitting user data on the control plane to thereby improve the performance of the LTE system to support machine type communication. The embodiments of the invention will be described below with reference to the drawings.

Firstly a description will be given respectively for implementations at an MTC device side and at the network side, and then a description will be given for an implementation under their cooperation, but this will not mean that both of them must cooperate for an implementation, and indeed, issues at the MTC device side and at the network side can also be addressed respectively in the separate implementations at the MTC device side and at the network side although a better technical effect can be achieved when both of them used in combination.

Figure 3:
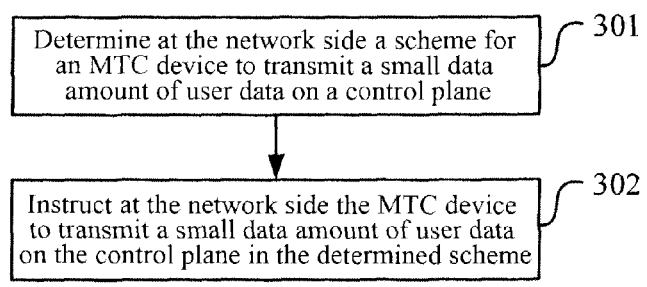
FIG. 3 is a schematic diagram of a flow of performing a method for a data transmission process of an MTC device at the network side in an embodiment of the invention.

FIG. 3 is a schematic diagram of a flow of performing a method for a data transmission process of an MTC device at the network side, and as illustrated, data can be transmitted in the following operations:

Operation 301. A scheme for an MTC device to transmit a small data amount of user data on a control plane is determined at the network side, where transmission data is regarded as a small data amount of data when the data amount of the transmission data is below a preset data amount.

Operation 302. The MTC device is instructed at the network side to transmit a small data amount of user data on the control plane in the determined scheme.

In order to make full use of an advantage of a scheme of transmitting a small data amount of user data on a control plane for improved efficiency of a system and also avoid possible congestion of transmitted and/processed signalling incurred or aggravated due to the use of this scheme, relevant indication information about transmission of a small data amount of data in a scheme of transmitting user data on a control plane can be transmitted at the network side, and thus the scheme adopted when a small data amount of data is transmitted at the UE side can be determined from the relevant indication information at the UE side after determining the relevant indication information about transmission of a small data amount of data in the scheme of transmitting user data on the control plane indicated at the network side.

In an implementation, the scheme for the MTC device to transmit a small data amount of user data on the control plane may include any one or combination of the following contents:

whether to allow the MTC device to transmit a small data amount of data in the scheme of transmitting user data on the control plane;

the size of a small data amount of data allowed to be transmitted by the MTC device;

signalling allowed to be used by the MTC device to transmit a small data amount of data;

a correspondence relationship between signalling allowed to be used by the MTC device to transmit a small data amount of data and a limited size of a small data amount of data allowed to be carried in the signalling;

information on the type of a terminal device allowed to transmit a small data amount of data in the scheme of transmitting user data on the control plane; and information on an attribute of a terminal device allowed to transmit a small data amount of data in the scheme of transmitting user data on the control plane.

In an implementation, the MTC device can be instructed at the network side in any one or combination of the following ways:

an agreement is made in advance between the network side and the MTC device;

the MTC device is instructed at the network side in a system broadcast;

the MTC device is instructed at the network side in dedicated signalling including any one or combination of NAS signalling, RRC signalling, MAC control signalling and physical layer control signalling; and the MTC device is instructed at the network side in a paging message.

In an implementation, the relevant indication information, about transmission of a small data amount of data in the scheme of transmitting user data on the control plane, transmitted at the network side may be generated by an eNB or a core network node.

When an eNB at the network side instructs the MTC device, the eNB may determine from information about a load strength of the control plane the scheme for the MTC device to transmit a small data amount of user data on the control plane; or When a core network node at the network side instructs the MTC device, the core network node may determine from its processing capacity and a signalling strength of a connected access network node the scheme for the MTC device to transmit a small data amount of user data on the control plane.

In an implementation, the MTC device may be instructed at the network side to transmit a small data amount of user data on control plane through transmitting the small data amount of user data in control plane signalling.

In an implementation, the MTC device may be instructed at the network side to transmit a small data amount of user data in the control plane signalling through transmitting the small data amount of user data carried in the control plane signalling.

Specifically, a small data amount of data may be transmitted in the scheme of transmitting user data on control plane control plane through transmitting the user data in control plane signalling, particularly in RRC signalling or NAS signalling. The user data may be transmitted in the control plane signalling through being carried in the signalling or through designing dedicated control plane signalling for transmitting the user data.

Figure 4:
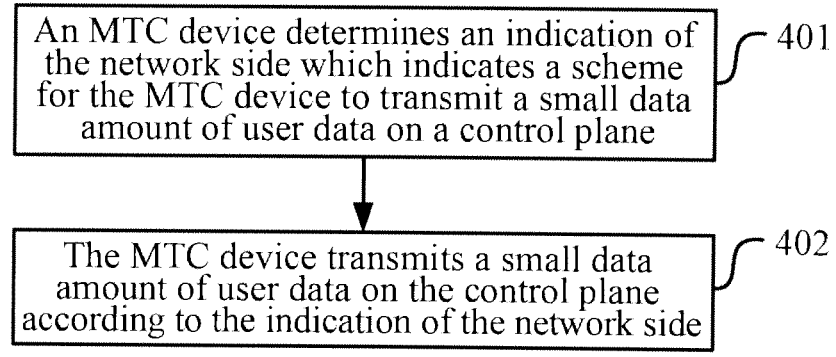
FIG. 4 is a schematic diagram of a flow of performing a method for a data transmission process of an MTC device at the MTC device side in an embodiment of the invention.

FIG. 4 is a schematic diagram of a flow of performing a method for a data transmission process of an MTC device at the MTC device side, and as illustrated, data can be transmitted in the following operations:

Operation 401. An MTC device determines an indication of the network side which indicates a scheme for the MTC device to transmit a small data amount of user data on a control plane; and Operation 402. The MTC device transmits a small data amount of user data on the control plane according to the indication of the network side.

Correspondingly in an implementation, the scheme for the MTC device to transmit a small data amount of user data on the control plane may include any one or combination of the following contents:

whether to allow the MTC device to transmit a small data amount of data in the scheme of transmitting user data on the control plane;

the size of a small data amount of data allowed to be transmitted by the MTC device;

signalling allowed to be used by the MTC device to transmit a small data amount of data;

a correspondence relationship between signalling allowed to be used by the MTC device to transmit a small data amount of data and a limited size of a small data amount of data allowed to be carried in the signalling;

information on the type of a terminal device allowed to transmit a small data amount of data in the scheme of transmitting user data on the control plane; and information on an attribute of a terminal device allowed to transmit a small data amount of data in the scheme of transmitting user data on the control plane.

Specifically the scheme adopted when a small data amount of data is transmitted at the UE side is determined from the indication information at the UE side through determining from the indication information: whether it is allowed by the network side to transmit a small data amount of information in the scheme of transmitting user data on the control plane, whether information to be transmitted at the UE side belongs to a small data amount of information, a specific kind of control plane signalling for transmitting a small data amount of information, etc.

In an implementation, the MTC device may determine the indication of the network side in any one or combination of the following ways:

the MTC device determines the indication of the network side from an agreement made in advance with the network side;

the MTC device determines the indication of the network side through receiving a system broadcast from the network side;

the MTC device determines the indication of the network side through receiving dedicated signalling, from the network side, including any one or combination of NAS signalling, RRC signalling, MAC control signalling or physical layer control signalling; and the MTC device determines the indication of the network side through receiving a paging message from the network side.

Specifically the indication information may be indicated explicitly or implicitly.

In an implementation, the MTC device may transmit a small data amount of user data on the control plane through transmitting the small data amount of user data in control plane signalling.

In an implementation, the MTC device may transmit a small data amount of user data in the control plane signalling through transmitting the small data amount of user data carried in the control plane signalling.

A description will be given below in connection with embodiments.

First Embodiment

In this embodiment, a small data amount of data is transmitted in a scheme of transmitting user data on a control plane after making a determination from relevant indication information.

Assuming: relevant indication information about transmission of a small data amount of data in a scheme of transmitting user data on a control plane is generated by an eNB; only a MTC type of UE is allowed to transmit a small data amount of data in the scheme of transmitting user data on the control plane; a UE is notified, in a system broadcast at the network side, of the relevant indication information about transmission of a small data amount of data in the scheme of transmitting user data on the control plane; a small data amount of data is carried by default in an RRC connection establishment completion message; the relevant indication information includes the following contents:

1) indicator of whether to allow transmission of a small data amount of data in the scheme of transmitting user data on the control plane; and 2) information about a limited size of a small data amount of data allowed to be transmitted;

and the UE needs to transmit data with a size of 95 bytes. Then an implementation may be as follows:

1. The eNB generates the relevant indication information about transmission of a small data amount of data in the scheme of transmitting user data on the control plane to indicate that: 1) it is currently allowed to transmit a small data amount of data in the scheme of transmitting user data on the control plane; and 2) the size of a small data amount of data allowed to be transmitted is below 100 bytes.

2. The eNB transmit the relevant indication information about transmission of a small data amount of data in the scheme of transmitting user data on the control plane in an MTC specific System Information Block (SIB).

3. The MTC device receives system information prior to transmission of data and determines from the indication in the MTC specific SIB in the system information that the data to be transmitted can be transmitted in the scheme of transmitting user data on the control plane.

4. The MTC device initiates a random access procedure, establishes an RRC connection and transmits information to be transmitted to the network side in an RRC connection establishment completion message.

In an implementation, the relevant indication information about transmission of a small data amount of data in the scheme of transmitting user data on the control plane may be generated by an eNB or a core network node (e.g., an MME, an S-GW, a P-GW and other core network nodes to be newly developed in the future). The eNB may generate the relevant indication information about transmission of a small data amount of data in the scheme of transmitting user data on the control plane according to a configuration condition of an interface to a core network, a signalling processing condition and other information from which a load strength of the control plane can be determined. The core network node may generate the relevant indication information about transmission of a small data amount of data in the scheme of transmitting user data on the control plane according to its processing capacity, a signalling strength of a connected access network node (including a NodeB, eNB, etc.) and other information.

Furthermore the relevant indication information about transmission of a small data amount of data in the scheme of transmitting user data on the control plane may further include the type(s) of signalling for transmitting a small data amount of data, for example, may indicate an RRC connection establishment request, an RRC connection establishment completion message or other uplink signalling in which to carry a small data amount of data, and may further indicate the sizes of user data that can be transmitted in various signalling. A different size of data can be transmitted in different signalling.

Furthermore the relevant indication information about transmission of a small data amount of data in the scheme of transmitting user data on the control plane may further indicate information on the type of an device, or information on an attribute of an device, allowed to transmit a small data amount of data in the scheme of transmitting user data on the control plane, for example, allow only an MTC device to transmit user data on the control plane, allow both an MTC device and a general UE to transmit user data on the control plane, allow an MTC device with a specific or some MTC features to transmit user data on the control plane, allow an MTC device belonging to a specific or some MTC groups to transmit user data on the control plane, etc. The indicated type and attribute information of device may be set as needed.

Second Embodiment

In this embodiment, an MTC device in an MTC group 1 can not transmit a small data amount of data in a scheme of transmitting user data on a control plane, as determined from relevant indication information.

Assuming: relevant indication information about transmission of a small data amount of data in a scheme of transmitting user data on a control plane is generated by an MME; another MTC device than an MTC device in an MTC group 1 is allowed to transmit a small data amount of data in the scheme of transmitting user data on the control plane; a small data amount of data is carried by default in an RRC connection reconfiguration completion message; a UE is notified, in dedicated signalling (RRC signalling) at the network side, of the relevant indication information about transmission of a small data amount of data in the scheme of transmitting user data on the control plane; the relevant indication information includes the following contents:

1) indicator of whether to allow transmission of a small data amount of data in the scheme of transmitting user data on the control plane;

2) information about a limited size of a small data amount of data allowed to be transmitted; and 3) an attribute of an device which is not allowed to transmit a small data amount of data in the scheme of transmitting user data on the control plane;

and the size of data to be transmitted by another MTC device than an MTC device in the MTC group 1 is below 100 bytes. Then an implementation can be as follows:

1. The MME generates the relevant indication information about transmission of a small data amount of data in the scheme of transmitting user data on the control plane to indicate that: 1) it is currently allowed to transmit a small data amount of data in the scheme of transmitting user data on the control plane; 2) the size of a small data amount of data allowed to be transmitted is below 100 bytes; and 3)

another MTC device than an MTC device in the MTC group 1 is allowed to transmit a small data amount of data in the scheme of transmitting user data on the control plane.

2. The MME transmits, the relevant indication information about transmission of a small data amount of data in the scheme of transmitting user data on the control plane, to the MTC device in RRC signalling during an initial access of the MTC device to the network (an attach procedure), and the relevant indication information can be updated each time the MTC device maintains a connection with the network.

3. The MTC device determines from the received relevant indication information whether data to be transmitted may be transmitted in the scheme of transmitting user data on the control plane prior to transmission of the data. An MTC device belonging to the MTC group 1 can not transmit data in the scheme of transmitting user data on the control plane, and another MTC device can transmit data with a size below 100 bytes in the scheme of transmitting user data on the control plane.

4. An random access procedure is initiated, an RRC connection is established, and another MTC device than an MTC device in the MTC group 1 transmits information to be transmitted to the network side in an RRC connection reconfiguration completion message.

Based upon the same inventive idea, there are further provided in embodiments of the invention a network side device and an MTC device, and since these devices address the problem under a similar principle to the methods for a data transmission process of a machine type communication device, reference can be made to the implementations of the methods for implementations of the devices, a repeated description of which will be omitted here.

Figure 5:
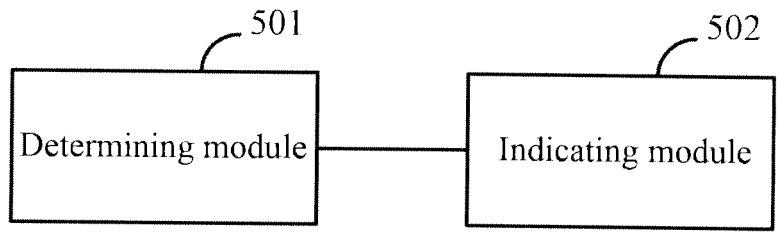
FIG. 5 is a schematic structural diagram of a network side device in an embodiment of the invention.

FIG. 5 illustrates a schematic structural diagram of a network side device, and as illustrated, the network side device may include:

a determining module 501 configured to determine a scheme of transmitting a small data amount of user data on a control plane for an MTC device, where transmission data is regarded as a small data amount of data when the data amount of the transmission data is below a preset data amount; and an instructing module 502 configured to instruct the MTC device to transmit a small data amount of user data on the control plane in the determined scheme.

In an implementation, the determining module may further be configured to determine the scheme of transmitting a small data amount of user data on the control plane for the MTC device through determining any one or combination of the following contents:

whether to allow the MTC device to transmit a small data amount of data in the scheme of transmitting user data on the control plane;

the size of a small data amount of data allowed to be transmitted by the MTC device;

signalling allowed to be used by the MTC device to transmit a small data amount of data;

a correspondence relationship between signalling allowed to be used by the MTC device to transmit a small data amount of data and a limited size of a small data amount of data allowed to be carried in the signalling;

information on the type of a terminal device allowed to transmit a small data amount of data in the scheme of transmitting user data on the control plane; and information on an attribute of a terminal device allowed to transmit a small data amount of data in the scheme of transmitting user data on the control plane.

In an implementation, the instructing module may further be configured to instruct the MTC device in any one or combination of the following ways:

an agreement is made in advance with the MTC device;

the MTC device is instructed in a system broadcast;

the MTC device is instructed in dedicated signalling including any one or combination of NAS signalling, RRC signalling, MAC control signalling or physical layer control signalling; and the MTC device is instructed in a paging message.

In an implementation, the determining module may further be configured to determine from information about a load strength of the control plane the scheme of transmitting a small data amount of user data on the control plane for the MTC device when the network side device is an eNB; or the determining module may further be configured to determine from processing capacity of a core network node and a signalling strength of a connected access network node the scheme of transmitting a small data amount of user data on the control plane for the MTC device when the network side device is the core network node.

In an implementation, the instructing module may further be configured to instruct the MTC device to transmit a small data amount of user data on control plane control plane through transmitting the small data amount of user data in control plane signalling.

In an implementation, the instructing module may further be configured to instruct the MTC device to transmit a small data amount of user data in the control plane signalling through transmitting the small data amount of user data carried in the control plane signalling.

Figure 6:
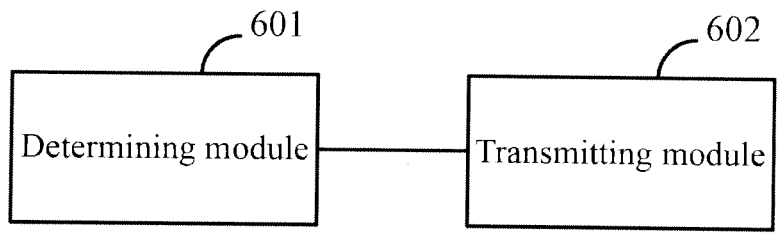
FIG. 6 is a schematic structural diagram of an MTC device in an embodiment of the invention.

FIG. 6 is a schematic structural diagram of an MTC device, and as illustrated, the MTC device may include:

a determining module 601 configured to determine an indication of the network side which indicates a scheme of transmitting a small data amount of user data on a control plane for the MTC device; and a transmitting module 602 configured to transmit a small data amount of user data on the control plane according to the indication of the network side.

In an implementation, the determining module may further be configured to determine the scheme to transmit a small data amount of user data on the control plane through determining any one or combination of the following contents:

whether to allow the MTC device to transmit a small data amount of data in the scheme of transmitting user data on the control plane;

the size of a small data amount of data allowed to be transmitted by the MTC device;

signalling allowed to be used by the MTC device to transmit a small data amount of data;

a correspondence relationship between signalling allowed to be used by the MTC device to transmit a small data amount of data and a limited size of a small data amount of data allowed to be carried in the signalling;

information on the type of a terminal device allowed to transmit a small data amount of data in the scheme of transmitting user data on the control plane; and information on an attribute of a terminal device allowed to transmit a small data amount of data in the scheme of transmitting user data on the control plane.

In an implementation, the determining module may further be configured to determine the indication of the network side in any one or combination of the following ways:

the indication of the network side is determined from an agreement made in advance with the network side;

the indication of the network side is determined through receiving a system broadcast from the network side;

the indication of the network side is determined through receiving dedicated signalling, from the network side, including any one or combination of NAS signalling, RRC signalling, MAC control signalling or physical layer control signalling; and the indication of the network side is determined through receiving a paging message from the network side.

In an implementation, the transmitting module may further be configured to transmit a small data amount of user data on the control plane through transmitting the small data amount of user data in control plane signalling.

In an implementation, the transmitting module may further be configured to transmit a small data amount of user data in the control plane signalling through transmitting the small data amount of user data through carrying the user data in the control plane signalling.

For the convenience of a description, the respective components of the foregoing devices have been described respectively by functionally dividing them into respective modules or units. Of course the functions of the respective modules or units can be performed in the same one or more items of software or hardware to put the invention into practice.

As can be apparent from the foregoing embodiments, relevant indication information about transmission of a small data amount of data in a scheme of transmitting user data on a control plane is transmitted at the network side so that it can be indicated to an MTC device whether data can be transmitted in the scheme of transmitting user data on the control plane.

For the network side, relevant indication information about transmission of a small data amount of data in a scheme of transmitting user data on a control plane is transmitted at the network side; and For the UE side, an MTC device receives the relevant indication information, about transmission of a small data amount of data in the scheme of transmitting user data on the control plane, transmitted at the network side, and determines from the indication information the scheme adopted when the MTC device transmits a small data amount of data.

Furthermore the relevant indication information about transmission of a small data amount of data in the scheme of transmitting user data on the control plane may include any one or combination of the following contents: whether to allow transmission of a small data amount of data in the scheme of transmitting user data on the control plane; information on a limited size of a small data amount of data allowed to be carried; signalling that can be used for transmitting a small data amount of data; a correspondence relationship between signalling that can be used for transmitting a small data amount of data and a limited size of a small data amount of data allowed to be transmitted in the signalling; information on the type of a terminal device allowed to transmit a small data amount of data in the scheme of transmitting user data on the control plane; and information on an attribute of a terminal device allowed to transmit a small data amount of data in the scheme of transmitting user data on the control plane.

Furthermore the contents of the relevant indication information, about transmission of a small data amount of data in the scheme of transmitting user data on the control plane, transmitted at the network side can be transmitted to the MTC device in the following ways or an agreement thereof can be made in the system: a system broadcast, dedicated signalling transmitted at the network side to the MTC device (including NAS signalling, RRC signalling, MAC control signalling, physical layer control signalling, etc.), a paging message, etc.

Furthermore the relevant indication information, about transmission of a small data amount of data in the scheme of transmitting user data on the control plane, transmitted at the network side may be generated by an eNB or a core network node.

Furthermore the scheme adopted when a small data amount of data is transmitted at the UE side may be determined from the indication information at the UE side through determining from the indication information:

whether it is allowed by the network side to transmit a small data amount of information in the scheme of transmitting user data on the control plane, whether information to be transmitted at the UE side belongs to a small data amount of information, a specific kind of signalling for transmitting a small data amount of information, etc.

The technical solutions proposed in the embodiments of the invention propose a solution of indicating a data transmission scheme, and since relevant indication information about transmission of a small data amount of data in a scheme of transmitting user data on a control plane is transmitted at the network side so that an MTC device may determine, from the relevant indication information transmitted at the network side, whether data can be transmitted in the scheme of transmitting user data on the control plane, it is thus possible to make use of the scheme of transmitting user data on the control plane to transmit a small data amount of data for improved efficiency of a system on one hand and to avoid congestion of transmitted and/or processed signalling that may be incurred or aggravated when a small data amount of data is transmitted purely in the scheme of transmitting user data on the control plane to thereby improve the performance of the LTE system to support MTC on the other hand.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A method for a data transmission process of a Machine Type Communication (MTC) device, comprising:
    determining, at a network side, a scheme of transmitting user data on a control plane for the MTC device; and
    instructing, at the network side, the MTC device to transmit user data on the control plane using the determined scheme,
    wherein the scheme of transmitting user data on the control plane for the MTC device includes
    an indication of types of signaling allowed to be used by the MTC device to transmit user data and a size limit of user data allowed to be carried in each respective type of signaling;
    wherein when instructing the MTC device at the network side is by a core network node, the method further comprises
    determining, by the core network node, from its processing capacity and a signaling strength of a connected access network node, the scheme of transmitting user data on the control plane for the MTC device.

2. The method of claim 1, further comprising
    instructing, at the network side, the MTC device in any one or combination of the following ways:
    making an agreement in advance between the network side and the MTC device;
    instructing, at the network side, the MTC device in a system broadcast;
    instructing, at the network side, the MTC device in dedicated signaling including any one or combination of Non Access Stratum (NAS) signaling, Radio Resource Control (RRC) signaling, Media Access Control (MAC) control signaling or physical layer control signaling; and
    instructing, at the network side, the MTC device in a paging message.

3. The method of claim 1, further comprising
    instructing the MTC device to transmit user data on the control plane through transmitting the user data in control plane signaling.

4. The method of claim 3, further comprising
    instructing the MTC device to transmit user data in the control plane signaling through transmitting the user data carried in the control plane signaling.

5. A method for a data transmission process of a Machine Type Communication (MTC) device, comprising:
    determining, by the MTC device, an indication of a network side which indicates a scheme of transmitting user data on a control plane for the MTC device; and
    transmitting, by the MTC device, user data on the control plane according to the indication of the network side,
    wherein the scheme of transmitting user data on the control plane for the MTC device includes
    an indication of types of signaling allowed to be used by the MTC device to transmit user data and a size limit of user data allowed to be carried in each respective type of signaling;
    wherein the scheme of transmitting user data on the control plane for the MTC device is determined by a core network node at the network side from its processing capacity and a signaling strength of a connected access network node.

6. The method of claim 5, further comprising
    determining, by the MTC device, the indication of the network side in any one or combination of the following ways:
    determining, by the MTC device, the indication of the network side from an agreement made in advance with the network side;
    determining, by the MTC device, the indication of the network side through receiving a system broadcast from the network side;
    determining, by the MTC device, the indication of the network side through receiving dedicated signaling, from the network side, including any one or combination of Non Access Stratum (NAS) signaling, Radio Resource Control (RRC) signaling, Media Access Control (MAC) control signaling or physical layer control signaling; and
    determining, by the MTC device, the indication of the network side through receiving a paging message from the network side.

7. The method of claim 5, further comprising
    transmitting, by the MTC device, user data on the control plane through transmitting the user data in control plane signaling.

8. The method of claim 7, further comprising
    transmitting, by the MTC device, user data in the control plane signaling through transmitting the user data carried in the control plane signaling.

9. A Machine Type Communication (MTC) device, comprising:
    a determining module configured to determine an indication of a network side which indicates a scheme of transmitting user data on a control plane for the MTC device; and
    a transmitting module configured to transmit user data on the control plane according to the indication of the network side,
    wherein each of the determining module and the transmitting module is implemented by one or more processors, wherein the one or more processors are coupled to a memory;
    wherein the determining module is further configured to determine the scheme of transmitting user data on the control plane through determining an indication of types of signaling allowed to be used by the MTC device to transmit user data and a size limit of user data allowed to be carried in each respective type of signaling;

wherein the scheme of transmitting user data on the control plane for the MTC device is determined by a core network node at the network side from its processing capacity and a signaling strength of a connected access network node.

10. The device of claim 9, wherein the determining module is further configured to determine the indication of the network side in any one or combination of the following ways:

the indication of the network side is determined from an agreement made in advance with the network side;

the indication of the network side is determined through receiving a system broadcast from the network side;

the indication of the network side is determined through receiving dedicated signaling, from the network side, including any one or combination of Non Access Stratum (NAS) signaling, Radio Resource Control (RRC) signaling, Media Access Control (MAC) control signaling or physical layer control signaling; and the indication of the network side is determined through receiving a paging message from the network side.

11. The device of claim 9, wherein the transmitting module is further configured to transmit user data on the control plane through transmitting the user data in control plane signaling.

12. The device of claim 11, wherein the transmitting module is further configured to transmit user data in the control plane signaling through transmitting the user data carried in the control plane signaling.

* * * * *